2,785,158

MONOAZO DYESTUFFS

Edgar Enders, Leverkusen-Bayerwerk, and Hans-Frank Piepenbrink, deceased, late of Leverkusen-Wiesdorf, Germany, by Ursula B. Piepenbrink, administratrix, Leverkusen-Wiesdorf, Germany, assignors to Farbenfabriken Bayer Aktiengesellschaft, Leverkusen, Germany, a corporation of Germany No Drawing. Application July 21, 1953,
Serial No. 369,520

Claims priority, application Germany July 31, 1952

4 Claims. (Cl. 260—199)

The present invention relates to new monoazo dyestuffs and to a process of making the same; more particularly it relates to monoazo dyestuffs corresponding to the following general formula

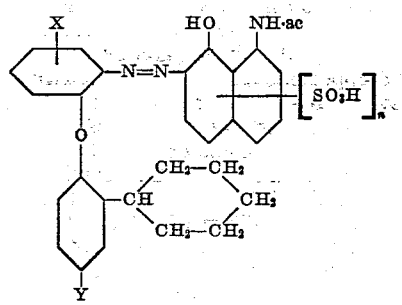

In this formula X stands for hydrogen or a simple substituent such as halogen or methyl, Y stands for hydrogen or cyclohexyl, and $n$ stands for 1 or 2.

The new monoazo dyestuffs are obtainable by coupling a diazotized amine of the formula

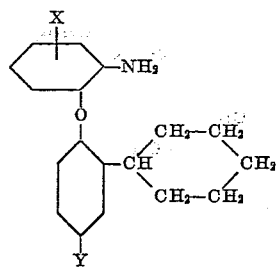

wherein X and Y have the same meaning as above, with 1-amino-8-hydroxy-naphthalene mono- or disulfonic acids substituted in the amino group by an acyl radical.

The diazotized amines used in making the new monoazo dyestuffs can be obtained by fusing together o-nitrochlorobenzene or its substitution products such as 2,4-dichloro-nitrobenzene, 2-nitro-3-chlorotoluene, 2,4-dichloro-5-nitrotoluene, 4-chloro-3-nitrotoluene, 2-nitro-1,4-dichlorobenzene, 3-nitro-1,2-dichlorobenzene with the alkali metal salts of 2-cyclohexyl- or 2,4-dicyclohexylphenols at elevated temperatures, e. g. about 120 to 160° C., and subsequent reducing the nitro group in the condensation product thus obtained. The cyclohexyl-phenols employed such as 2-cyclohexylphenol and 2,4-dicyclohexylphenol or mixtures of the same are easily accessible compounds which are obtained on a technical scale by reacting phenol with chlorocyclohexane. Diazotization of the aminodiaryl ethers containing two cyclohexyl radicals is expediently carried out in solvents such as formic acid, formamide or alcohol.

Suitable coupling components of the above mentioned kind are the N-acyl derivatives of 1-amino-8-hydroxynaphthalene mono- or disulfonic acids e. g. of 1-amino-8-hydroxy-naphthalene-4-sulfonic acid, 1-amino-8-hydroxynaphthalene-6-sulfonic acid, 1-amino-8-hydroxy-naphthalene-3,6-disulfonic acid, 1-amino-8-hydroxy-naphthalene-4,6-disulfonic acid. As N-acyl-substituents may be mentioned acyl radicals of the aromatic series such as the benzoyl radical, substituted benzoyl radicals, the benzene sulfoyl radical, substituted benzene sulfoyl radicals, further aliphatic acyl radicals such as the acetyl radical, substituted acetyl radicals, higher fatty acid radicals or radicals as e. g. the trichloro-acryloyl radical.

The new monoazo dyestuffs dye animal fibres and such fibres as show a similar behavior in dyeing, clear red to bluish-red shades of very good fastness to wet treatment and good general fastness properties; further they partly dye very well from a neutral bath. In comparison with the known dyestuffs bearing a cyclohexyl radical only in p-position to the —O-bridge the new dyestuffs are distinguished by a greater clearness of the shades.

The following examples illustrate the invention without, however, being limited thereto; the parts by weight and the parts by volume stand in the ratio of gramme to cubic centimetre.

Example 1

7.8 parts by weight of 2-amino-2'-cyclohexyl-1,1'-diphenyl ether are boiled with 7.0 parts by volume of 30% hydrochloric acid and 25 parts by volume of water and the hydrochloride of this aminodiphenyl ether is finely distributed with good stirring. Ice is then added in quantities so as to cause a temperature drop to 0–5° C. and a 20% solution of 2.2 parts by weight of sodium nitrite is added in drops. After complete dissolution has been reached the solution is stirred for some time and the excess of nitrous acid destroyed with amidosulfonic acid. The solution of the diazo compound is dropped into a solution of 13.5 parts by weight of 1-benzoylamino-8-hydroxynaphthalene-3,6-disulfonic acid in 100 parts by volume of 15% sodium carbonate solution and 200 parts by volume of ice water, and the mixture is stirred at room temperature for some hours. The coupling mixture is then heated to 70–80° C., the dyestuff precipitated by addition of sodium chloride, filtered and dried. A red powder is obtained which dissolves in water with clear blue-red coloration and dyes wool clear bluish-red shades of good fastness properties from a neutral bath or a bath containing formic acid. When using as coupling components 1-(2',5'- dichlorobenzoylamino)- 8 - hydroxynaphthalene-4,6-disulfonic acid, 1-(2',4'-dichlorobenzoylamino)-8-hydroxynaphthalene-4,6-disulfonic acid, 1-benzoylamino-8-hydroxynaphthalene-4,6-disulfonic acid, 1-(diphenylmethane-α-carboylamino)- 8 - hydroxynaphthalene-3,6-disulfonic acid or 1-(2',4'-dichlorophenoxyacetylamino)-8-hydroxynaphthalene-3,6-disulfonic acid dyestuffs are obtained, which dye wool in clearless bluish-red shades of similar properties. When 1-benzoylamino-8-hydroxynaphthalene-4-sulfonic acid is used as coupling component a dyestuff is obtained which dyes wool clear Bordeaux shades from neutral bath.

Thus, the compound prepared using diazotized 2-amino-2'-cyclohexyl-1,1'-diphenyl ether and 1-(2',4'-dichlorophenoxyacetylamino) - 8 - hydroxynaphthalene - 3,6-disulfonic acid has the formula

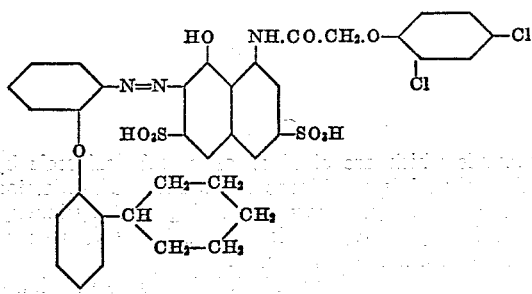

2-amino-2'-cyclohexyl-1,1'-diphenyl ether of the formula

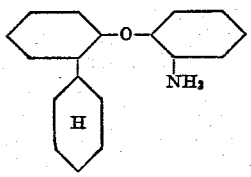

which is employed as diazotizing component, can be obtained as follows:

200 grams of o-nitrochlorobenzene are introduced into a melt of 280 grams of o-cyclohexylphenol and a concentrated aqueous solution of 90 grams of caustic alkali and stirred at 135–140° C. for 8 hours. The melt is stirred with water and distilled in vacuo after decanting the water. B. P. 190–211° C. at 0.4 mm. pressure; yield: 80–85% of theory. The 2-nitro-2'-cyclohexyl-1,1'-diphenyl ether thus obtained is hydrogenated in alcoholic solution in the presence of Raney catalyst and the amine is distilled: B. P. 168–188° C. at 0.2 mm. pressure. The yield is almost quantitative. The nitrodiphenyl ether can be hydrogenated with the same result also without previous purification.

*Example 2*

7.8 parts by weight of 2-amino-2'-cyclohexyl-1,1'-diphenyl ether are diazotized as described in Example 1 and the resultant diazo solution is dropped into a solution of 16.5 parts by weight of 1-(2',5'-dimethyl-4-'-chlorobenzenesulfoylamino) - 8 - hydroxynaphthalene - 3,6 - disulfonic acid in 100 parts by volume of 15% sodium carbonate solution and 200 parts by volume of ice water. After stirring for some hours the solution is heated to 70–80° C., the dyestuff separated by addition of sodium chloride, filtered and dried. A red powder is obtained, which dyes wool clear bluish-red shades of good fastness properties from neutral or weakly acid bath. Dyestuffs with similar properties are obtained when 1-(4'-methylbenzene - sulfoylamino) - 8 - hydroxynaphthalene - 3,6-disulfonic acid is employed as coupling component.

*Example 3*

8.8 parts by weight of 2-amino-5-chloro-2'-cyclohexyl-1,1'-diphenyl ether are dissolved in 70 parts by volume of formamide and 10 parts by volume of 30% hydrochloric acid and a 20% aqueous solution of 2.2 parts by weight of sodium nitrite is added in drops at 0–5° C. After stirring for 30 minutes the excess nitrous acid is destroyed with amidosulfonic acid and the solution of the diazo compound is dropped into a solution of 16.0 parts by weight of 1-(2',5'-dichlorobenzoylamino)-8-hydroxynaphthalene-4,6-disulfonic acid in 100 parts by volume of 15% sodium carbonate solution and 300 parts by volume of ice water. After stirring for some hours the solution is heated to 70–80° C., the dyestuff precipitated by addition of sodium chloride, filtered and dried. A red powder is obtained, which dyes wool clear red shades of good fastness properties from neutral or weakly acid bath. When 1-(2'-5'-dimethyl-4'-chlorobenzene - sulfoylamino) - 8 - hydroxynaphthalene - 3,6-disulfonic acid is used as coupling component, a dyestuff is obtained which dyes wool clear bluish-red shades.

2-amino-5-chloro-2'-cyclohexyl-1,1'-diphenyl ether of the formula

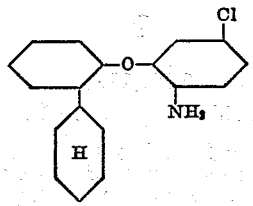

which is employed as diazo component, can be obtained by reacting 2,4-dichloronitrobenzene with a melt of molar quantities of caustic alkali in o-cyclohexylphenol at 120° C. and catalytically reducing the nitro group; B. P. 205–210° C. at 0.6 mm. pressure.

*Example 4*

10.1 parts by weight of 2-amino-2',4'-dicyclohexyl-1,1'-diphenyl ether are dissolved in 20 parts by weight of formic acid with heating; after cooling the solution to 0–5° C. 2.0 parts by weight of monohydrate and thereafter a solution of 2.2 parts by weight of sodium nitrite in 4 parts by volume of water are added in drops. After stirring for 30 minutes the excess nitrous acid is destroyed by introducing some solid amidosulfonic acid, the mixture is diluted with 50 parts by volume of formamide and dropped into a solution of 13.5 parts by weight of 1-benzoylamino - 8 - hydroxynaphthalene - 3,6 - disulfonic acid in 50 parts by volume of 25% ammonia solution, 200 parts by volume of ice water and 200 parts by volume of methanol. After the coupling reaction is complete the solution is heated to 60–70° C. and the dyestuff precipitated by addition of saturated sodium chloride solution, filtered and dried. It is obtained as a red powder which dyes wool from neutral or weakly acid bath clear bluish-red shades of very good fastness to wet treatment and good general fastness properties it has the formula

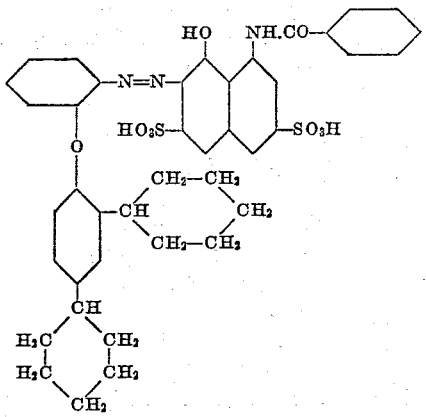

In particular the dyestuff shows a very good affinity from neutral bath, that means the dyeings produced from neutral bath and a bath containing formic acid show entirely equal depth of color and the bath exhausted under neutral conditions hardly stains wool under acid conditions. Dyestuffs with similar properties are obtained when 1-benzoylamino - 8 - hydroxynaphthalene - 4,6 - disulfonic acid or 1 - (4' - methylbenzene - sulfoylamino) - 8-hydroxynaphthalene-3,6-disulfonic acid are used as coupling component or a mixture of 2-amino-2',4'-dicyclohexyl-1,1'-diphenyl ether and 2-amino-2'-cyclohexyl-1,1'-diphenyl ether is employed as diazotizing component.

2-amino-2′,4′-dicyclohexyl-1,1′-diphenyl ether of the formula

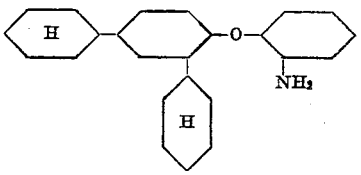

which is employed as diazotizing component, can be obtained as follows: The technical distillation residues of monocyclohexylphenols yield in a quantity of about 30–40% by distillation a fraction of the B. P. 190–200° C. at 0.2 mm. pressure as a viscous colorless oil, which is almost pure 2,4-dicyclohexylphenol. 150 grams of dicyclohexylphenol are homogeneously fused with 35 grams of caustic alkali, 105 grams of o-nitrochlorobenzene are introduced and the mixture is stirred at 150–160° C. for 8 hours. The melt is stirred with water to remove the potassium chloride, separated from the aqueous phase and hydrogenated in the presence of Raney catalyst. By distillation a product of the B. P. 204–208° C. at 0.1 mm. pressure is obtained in a yield of 60–70% as a viscous oil of light yellowish color. It is also possible to employ a starting material of a wider boiling range and therefore of a higher proportion of monocyclohexylphenyl. In this manner a mixture of bases of a wider boiling range is obtained which, however, results in dyestuffs of very similar properties.

We claim:

1. Monoazo dyestuffs corresponding as free acids to the formula

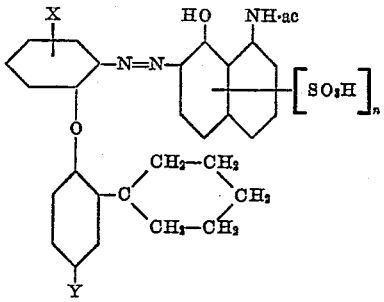

wherein X stands for a radical selected from the group consisting of hydrogen, chlorine and methyl, Y stands for a radical selected from the group consisting of hydrogen and cyclohexyl, $n$ stands for one of the integers 1 and 2, and ac stands for an acyl radical.

2. The monoazo dyestuff corresponding as free acid to the formula

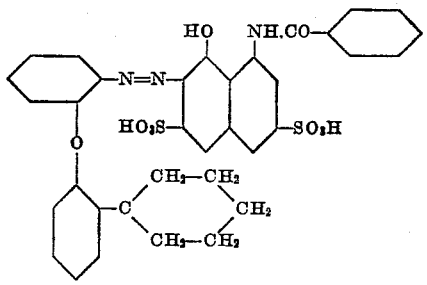

3. The monoazo dyestuff corresponding as free acid to the formula

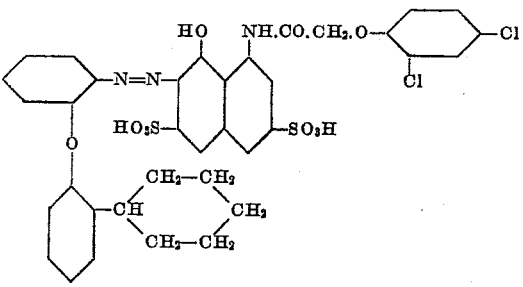

4. The monoazo dyestuff corresponding as free acid to the formula

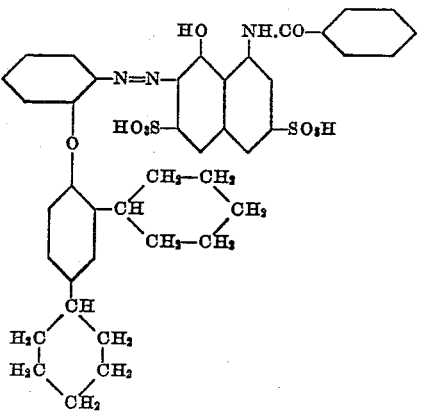

References Cited in the file of this patent
UNITED STATES PATENTS

| | | |
|---|---|---|
| 1,824,686 | Richard | Sept. 22, 1931 |
| 2,273,517 | Fischer et al. | Feb. 17, 1942 |